United States Patent [19] [11] Patent Number: 5,521,276
Choi et al. [45] Date of Patent: May 28, 1996

[54] POLYAMIDEIMIDE RESINS CONTAINING ISOPHORONE DIAMINE STRUCTURES

[75] Inventors: Kil-Yeong Choi, Doryong-dong; Mi-Hie Yi, Daejeon; Jae-Heung Lee, Daejeon; Moon-Young Jin, Daejeon; Young-Taik Hong, Daejeon, all of Rep. of Korea

[73] Assignee: Korea Research Institute of Chemical Technology, Daejeon, Rep. of Korea

[21] Appl. No.: 263,470

[22] Filed: Jun. 22, 1994

[30] Foreign Application Priority Data

Jul. 5, 1993 [KR] Rep. of Korea ............... 1993-12717

[51] Int. Cl.$^6$ ..................................... C08G 73/10
[52] U.S. Cl. ..................... 528/322; 528/170; 528/172; 528/173; 528/188; 528/220; 528/229; 528/332; 528/340; 528/341; 528/350
[58] Field of Search ..................... 528/322, 170, 528/172, 173, 188, 220, 229, 332, 340, 341, 350

[56] References Cited

U.S. PATENT DOCUMENTS

| | | | |
|---|---|---|---|
| 4,017,459 | 4/1977 | Onder | 260/47 CP |
| 4,045,407 | 8/1977 | Keske | 260/47 |
| 4,066,631 | 1/1977 | Dimmig | 528/350 |

FOREIGN PATENT DOCUMENTS

| | | |
|---|---|---|
| 63-258927 | 10/1988 | Japan . |
| 63-256627 | 10/1988 | Japan . |
| 218422 | 1/1990 | Japan . |
| 284404 | 3/1990 | Japan . |
| 297527 | 4/1990 | Japan . |

*Primary Examiner*—James J. Seidleck
*Assistant Examiner*—Duc Truong
*Attorney, Agent, or Firm*—Ladas & Parry

[57] ABSTRACT

Polyamideimide resins having the formula (I)

in which repeating units are bound in a head to tail or head to head manner,

R is at least two divalent groups selected from the group consisting of (cis-, trans- conformational mixture) wherein one divalent group is group in a PAI molecule, produced by introducing isophorone diamine into the conventional aromatic polyamideimide resins.

7 Claims, 4 Drawing Sheets

(a) Torlon 4203L  (b) P-2

(a) Torlon 4203L  (b) Torlon 4000T  (c) Ultem-1000  (d) P-2

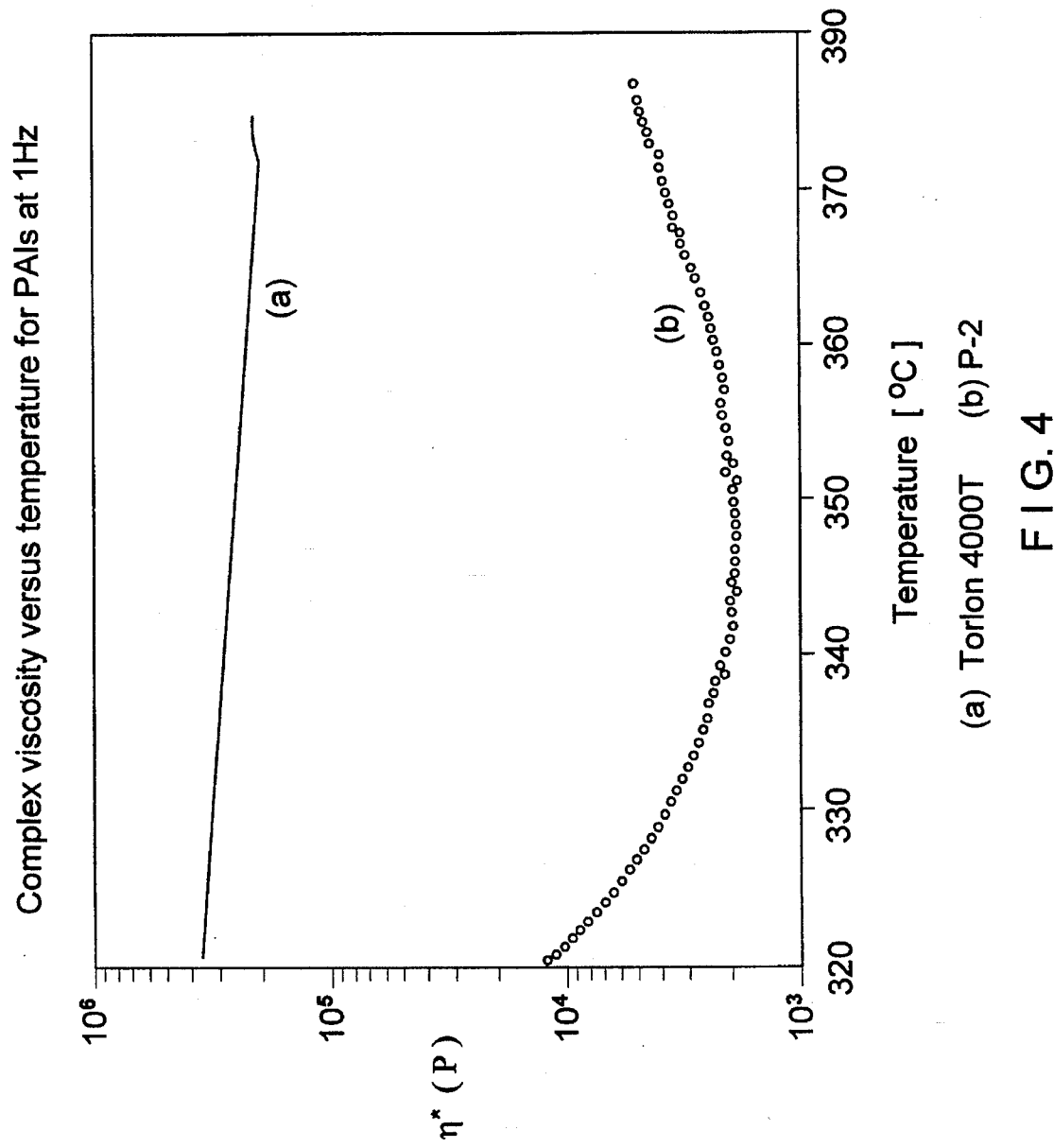

POLYAMIDEIMIDE RESINS CONTAINING ISOPHORONE DIAMINE STRUCTURES

BACKGROUND OF THE INVENTION

1. Field of the Invention

The present invention relates to novel polyamideimide resins and to a process for preparing them. More specifically, it relates to a novel type of polyamideimide resins having excellent solubility and melt flowability as well as heat resistance by mixing aromatic diamines with aliphatic diamines, and a process for preparing them.

2. Description of the Prior Art

Polyamideimide resins are, in general, amorphous thermoplastic resins which can be prepared by the polycondensation of aromatic tricarboxylic acids (or their derivatives) with aromatic diamines or aromatic diisocyanates. The molecular structures of the polyamideimide resins vary depending on the type of monomers employed, but the typical example of them are represented by the following formula (i)

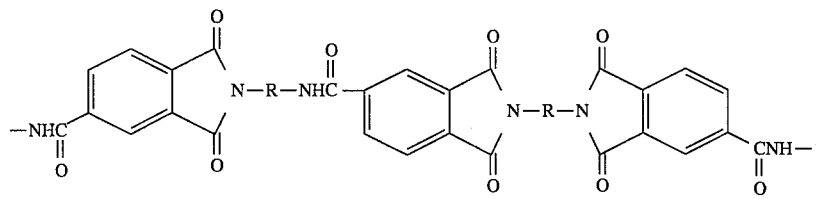

wherein R=

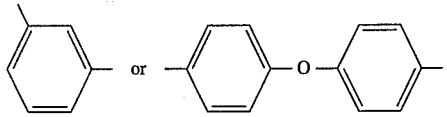

prepared by the polycondensation of trimellitic acid (or its derivatives) as an aromatic tricarboxylic acid component with meta-phenylene diamine and diaminodiphenylether as an aromatic diamine component.

Polyamidimide resins of formula (i) are disclosed in U.S. Pat. No. 4,045,407 and Japanese Patent Laid-Open No. 02-18,422. They are transparent and noncrystalline resins which have the following properties:

(1) They have a heat distortion temperature of 278° C. and a long term heat resistance temperature exceeding 200° C. They have a broad usable temperature range from −200° C. to 260° C.;

(2) They have not only high mechanical strength and excellent impact resistance but also good stiffness providing physical property at room temperature of general engineering plastics even at temperature exceeding 200° C.;

(3) They also have creep resistance;

(4) They have a small linear expansion coefficient of $4 \times 10^{-5}$ cm/cm. ° C., which can be reduced to less than a half by using filler.

(5) They have excellent insulation breakdown strength and volume resistivity, and show inflammability of UL 94 V-O without adding additives.

(6) They have a good wear resistance property by means of the compositing with PTFE and graphite. They are suitable as sliding member under severe circumstance since they have good self-lubricating properties, wear resistance and strength and elasticity even at high temperatures.

(7) They have good chemical resistance and are stable in a hydrocarbon type solvent, though care must be taken in concentrate aqueous alkali solution.

(8) They have good ultraviolet resistance and radiation resistance. The existing resins of formula (i) have excellent heat resistance, but they require melt processing at a temperature as high as 400° C. due to their high melt viscosity. Such processing at high temperature leads to significant thermal decomposition of the resins, and requires specific process equipment resulting in higher processing costs.

To eliminate the disadvantages of the conventional polyamideimide resins, U.S. Pat. No. 4,017,459 suggested the use of diamines wherein a flexible group such as —O— and —C(CH$_3$)$_2$— is present between two benzene rings, and Japanese Patent Laid-Open Nos. 02-84,404 and 02-97,527 suggested the preparation of injection moldable polyamideimide wherein diamines having a bond such as —O—, —S—, —SO$_2$—, —CO— or —C(CH$_3$)$_2$— between two benzene rings or substituted monomers are employed. Moreover, Japanese Patent Publication Nos. 63-258,927 and 63-256,627 suggested the use of the diamines wherein aromatic diamines are partly replaced by aliphatic diamines. The polyamideimide resins modified as described above have a decreased melt molding temperature owing to the increased chain flexibility, but their heat resistance and mechanical properties are significantly decreased. Therefore, the resins are impractical.

In order to solve the above-mentioned problems, assiduous studies have been made by the inventors of the present application to find improved polyamideimide resins having better melt processability combined with the existing properties including good solubility and general physical properties of the conventional polyamideimide resin. This is to ensure that they can be used as major heat resistance structural materials in advanced industries, for example, the auto, electrical and electronic, and aerospace industries. As a result, the present inventors have now found that by modifying the aromatic diamines of the conventional polyamideimide resins, particularly by choosing isophorone diamine as an aliphatic diamine and then mixing it with aromatic diamines, polyamideimide resins can be produced which have good mechanical properties and processability. The present invention is based on these findings.

BRIEF DESCRIPTION OF THE DRAWINGS

FIG. 4 shows complex viscosity versus temperature for polyamideimide resins at 1 Hz.

SUMMARY OF THE INVENTION

Figure 1:
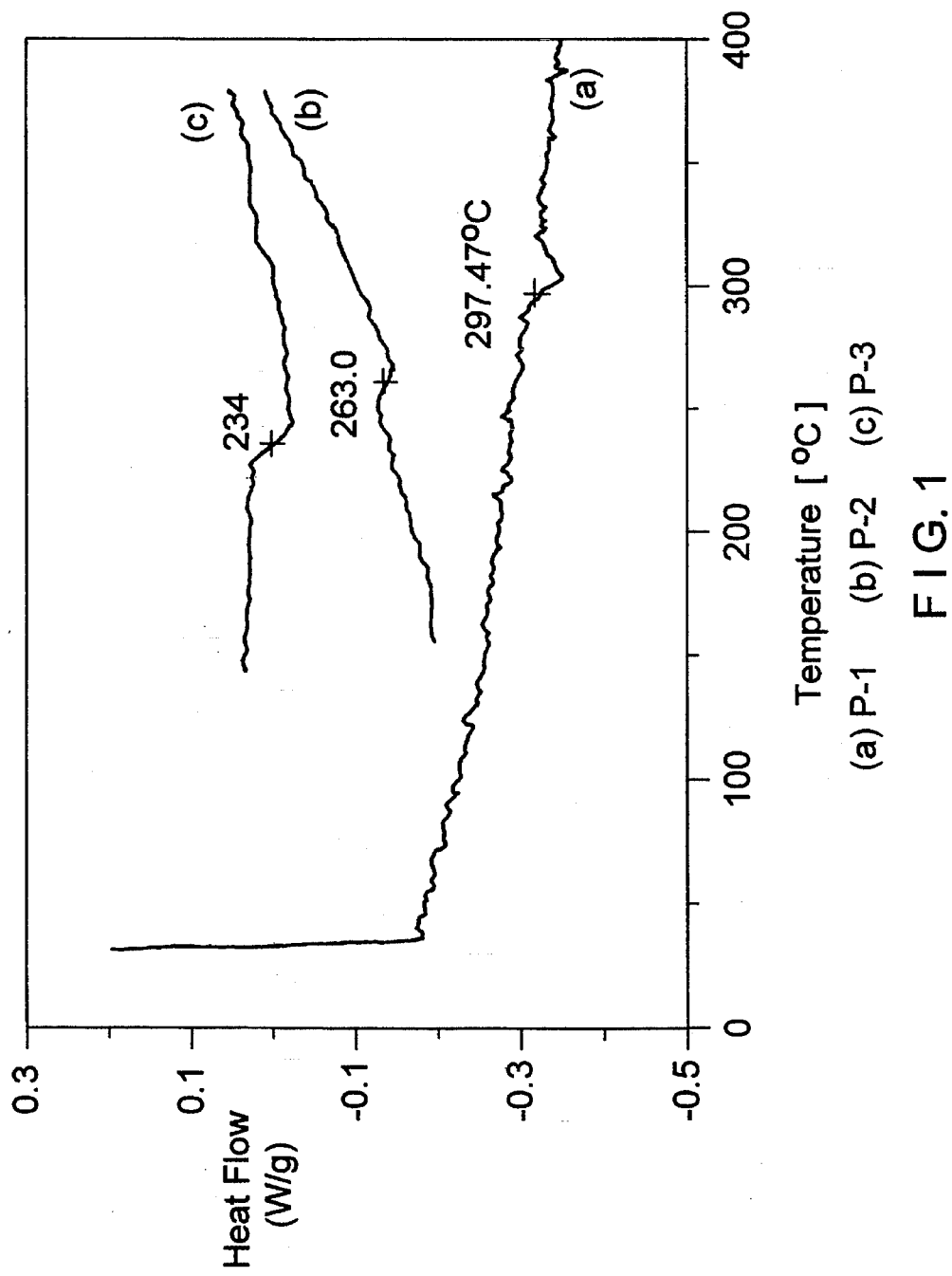
FIG. 1 shows the differential scanning calorimeter curves of the novel polyamideimide resins.

The present invention is directed to polyamideimide resins having excellent heat resistance, solubility, mechanical properties and film formability as well as greatly improved processability owing to low melt viscosity by introducing isophorone diamine as a part of a monomer into convention PAI resins, and a process for preparing them.

DETAILED DESCRIPTION OF THE INVENTION

One object of the present invention is to provide novel polyamideimide resins represented by the formula (I) containing isophorone diamine

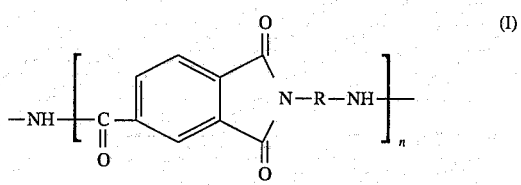

in which repeating units are bound in a head to tail or head to head manner,

R is at least two divalent groups selected from the group consisting of

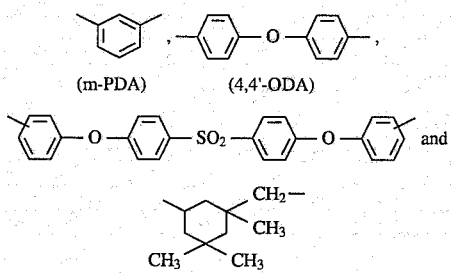

with at least some

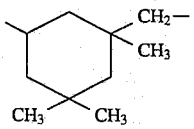

group in a PAI molecule.

Another object of the present invention is to provide a process for preparing polyamideimide resins by solution polycondensation reaction of trimellitic acid (or its derivatives) with isophorone diamine (IPD, cis-, trans-conformational mixture) represented by the formula (II)

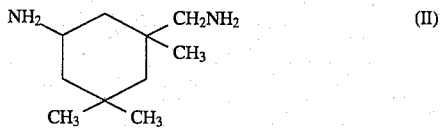

as an aliphatic diamine component and at least one component of meta-phenylene diamine (m-PDA), diaminodiphenylether (ODA), meta-bisaminophenoxy diphenyl sulfone(m-BAPS) and para-bisaminophenoxy diphenylsulfone(p-BAPS) as an aromatic diamine component.

Other objects and advantages will be apparent to those of ordinary skill in the art from the following descriptions and drawings.

Polyamideimide (hereinafter referred to as PAI) resins according to the present invention wherein aliphatic diamine of the formula (II) is introduced are characterized by a weight average molecular weight (Mw) of 20,000 to 80,000 g/mol or so, inherent viscosity in the range of 0.2 to 0.8 dL/g and glass transition temperature of 220° C. to 300° C. The PAI resins are also easily soluble in aprotic polar solvents such as dimethylacetamide, dimethyl formamide, N-methyl-2-pyrrolidone in addition to organic solvents such as m-cresol. In addition, these PAI resins have a tensile strength of 1,050 to 1,300 kg/cm$^2$ which is measured in a film state. Moreover, the PAI resins prepared by the present invention have a melting viscosity of about $10^3$ to $10^6$ poise measured at 300° C. and a frequency of $10^{-1}$ rad/sec.

The present PAI resins can be used as a major heat resistance material in advanced industries such as the auto, electrical and electronic and the aerospace industries owing to their good heat resistance, solubility and melt property.

Now, the present invention will be described more specifically with reference to examples hereafter, however, it should be noted that the present invention is not intended to be restricted within these specific examples.

EXAMPLE 1

51 g (0.3 mol) of isophorone diamine and 76 g (0.7 mol) of meta-phenylenediamine were dissolved, with nitrogen gas being passed slowly through, in 1300 g of dimethylacetamide in a 3 liter reactor equipped with a stirrer, a temperature regulator, a nitrogen inlet, a dropping funnel and a condenser. To this reactor was added 210 g (1.0 mol) of anhydrous trimellitic chloride while the internal temperature of the reactor was maintained at 10° C. or less using temperature regulator. After stirring at room temperature over 3 to 5 hours or so, 101 g (1.0 mol) of triethylamine was added and then the solution was continuously stirred for 24 hours. To this solution were added 400 ml each of anhydrous acetic acid and pyridine. After stirring for 24 hours, the reaction mixture was subjected to excess methanol in a Waring (™) blender to precipitate polymer. The precipitated polymer was separated by filtration, washed several times with water and methanol, and then dried in a vacuum drier at 120° C. for 24 hours to give a polymer (P-1) as a yellow powder. The inherent viscosity as measured on a solution of dimethylacetamide at a concentration of 0.5 g/dL at 30° C. was 0.32 dL/g.

EXAMPLE 2

The procedure of Example 1 was repeated except that 140 g (0.7 mol) of diaminodiphenylether and 51 g (0.3 mol) of isophorone diamine were dissolved in dimethylacetamide and then 210 g (1.0 mol) of anhydrous trimellitic chloride was added to give a PAI resin (P-2) having an inherent viscosity of 0.41 dL/g as measured on a solution of dimethyl acetamide as a solvent at a concentration of 0.5 g/dL at 30° C.

EXAMPLE 3

The procedure of Example 1 was repeated except that 302 g (0.7 mol) of meta-bisaminophenoxyphenylsulfone and 51 g (0.3 mol) of isophorone diamine were dissolved in dimethylacetamide and then 210 g (1.0 mol) of anhydrous trimellitic chloride was added to give a PAI resin (P-3) having an inherent viscosity of 0.38 dL/g as measured on a solution of dimethylacetamide as a solvent at a concentration of 0.5 g/dL at 30° C.

EXAMPLE 4

The procedure of Example 1 was repeated except that 302 g (0.7 mol) of para-bisaminophenoxyphenylsulfone and 51 g (0.3 mol) of isophorone diamine were dissolved in dimethylacetamide and then 210 g (1.0 mol) of anhydrous trimellitic chloride was added to give a PAI resin (P-4) having an inherent viscosity of 0.40 dL/g as measured on a solution of dimethylacetamide as a solvent at a concentration of 0.5 g/dL at 30° C.

COMPARATIVE EXAMPLE 1

The procedure of Example 1 was repeated except that 32 g (0.3 mol) of meta-phenylenediamine and 140 g (0.7 mol) of diamine diphenylether were dissolved in dimethylacetamide and then 210 g (1.0 mol) of anhydrous trimellitic chloride was added to give a PAI resin (P-5) having an inherent viscosity of 0.54 dL/g as measured on a solution of dimethyl acetamide as a solvent at a concentration of 0.5 g/dL at 30° C. [Molecular weight, thermal analysis and tensile strength]

Table 1 below shows the experimental results of the thermal analysis, molecular weights and tensile strengths of the PAI resins prepared in the Examples.

TABLE 1

| Ex. No. | Polymer | Inherent viscosity (dL/g) | Tg (°C.) | Film moldability by solvent casting | Tensile Strength (Kg/cm$^2$) |
|---|---|---|---|---|---|
| 1 | P-1 | 0.32 | 298 | tough | 1,111 |
| 2 | P-2 | 0.41 | 263 | tough | 1,144 |
| 3 | P-3 | 0.38 | 234 | tough | 1,066 |
| 4 | P-4 | 0.40 | 257 | tough | 1,210 |
| Comp. Ex. 1 | P-5 | 0.54 | 279 | tough | 1,260 |

As seen from Table 1, the novel PAI resins according to the present invention were obtained as amorphous and transparent resins regardless of the component ratio. The tensile strengths of the resins measured in a film state were in a range of 1,000 to 1,300 kg/cm$^2$, which showed considerably good mechanical strength.

Figure 2:
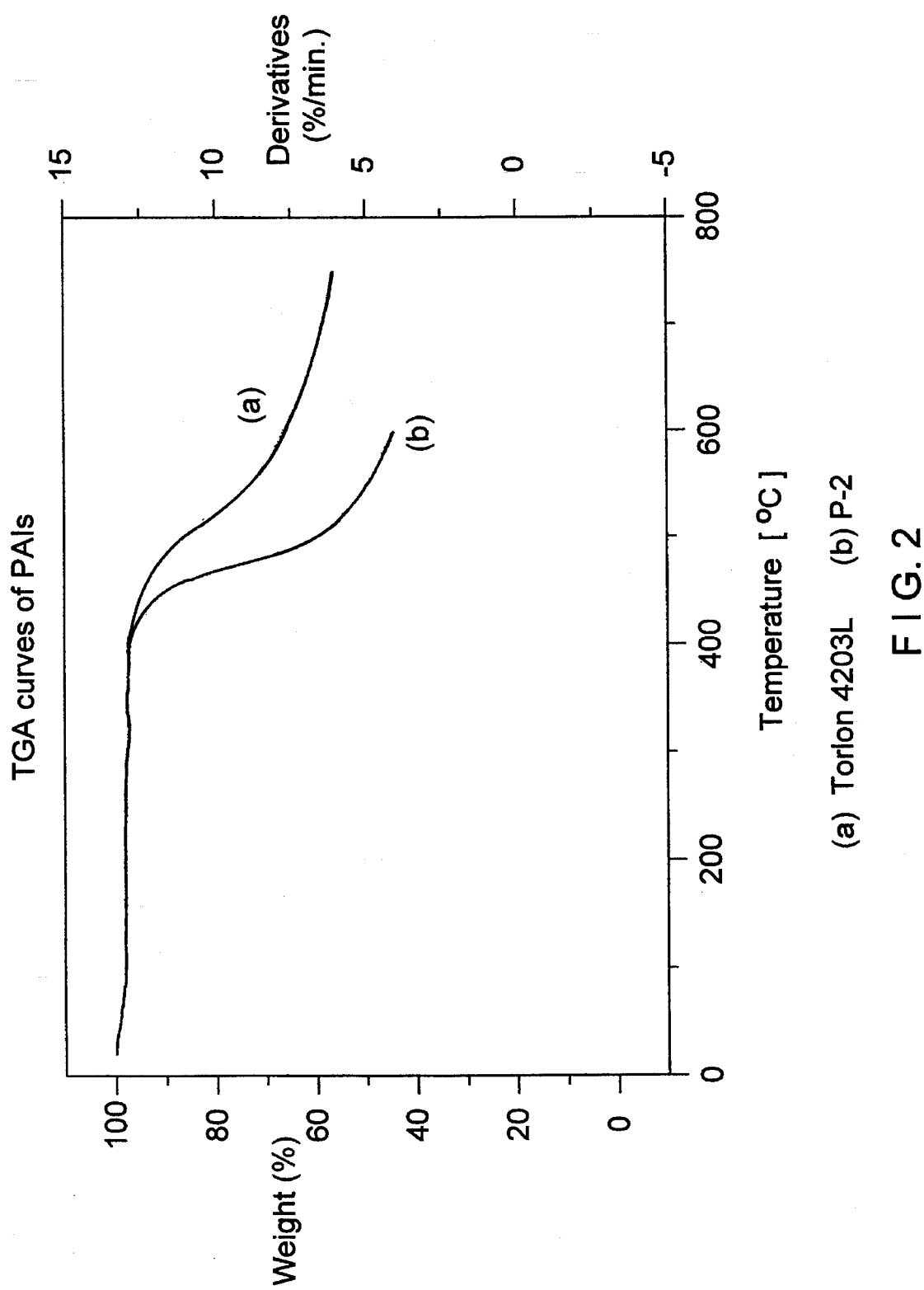
FIG. 2 shows the thermogravimetric analysis curves of the novel polyamideimide resins.

In order to determine the thermal properties of the PAI resins according to the present invention, heat stability and glass transition temperatures were measured by thermogravimetric analysis (TGA) and a differential scanning calorimeter (DSC). As seen from FIG. 1, the PAI resins have glass transition temperatures of 234° to 298° C. For example, P-1, where meta-phenylenediamine and isophorone diamine were used as monomers, has a glass transition temperature which is 20° C. or so higher than that of Torlon as a representative polyamidimide resin. In the present invention, the glass transition temperature was measured by changing the kind of aromatic diamine in order to observe the effect of the structure of the aromatic diamine used together with isophorone diamine on the glass transition temperatures of the resins. As a result, it has been found that glass transition temperature was decreasing as the flexibility of the molecular structure of the aromatic diamine employed increased as shown in Table 1 and FIG. 2. FIG. 2 shows the TGA curves of Torlon and the new modified PAI resins, wherein P-2, according to the present invention, has a remain weight of 45.2% at 800° C. and 10% weight loss temperature of 467° C. which shows relatively good heat stability although a little inferior to that of the Torlon.

Melt processability

The melt viscosity of the PAI resins was measured by a Rheometrics Dynamic Spectrometer (RDS) to determine the processability of the PAI resins according to the present invention. The evaluation results are shown in Table 2.

TABLE 2

| Ex. No. | Polymer | Tg (°C.) | Melt Viscosity (poise) |
|---|---|---|---|
| 1 | P-1 | 298 | 2.0 × 10$^5$ |
| 2 | P-2 | 263 | 1.5 × 10$^4$ |
| 3 | P-3 | 234 | 2.6 × 10$^3$ |
| 4 | P-4 | 257 | 8.5 × 10$^3$ |
| Torlon | P-5 | 279 | 1.8 × 10$^7$ |
| Ultem | — | 217 | 2.1 × 10$^4$ |

The determination of the melt viscosity of the PAI resins was carried out as follows: At first, PAI resins in a powder state were hot pressed to give a parallel plate (diameter: 25 mm, thickness: 2 mm). After heating the sample plate to 330° C., the melt viscosity of the PAI resins was measured at the same temperature while the frequency was changed through a range of 0.1 to 500 rad/sec. Stress was fixed at 10%.

Figure 3:
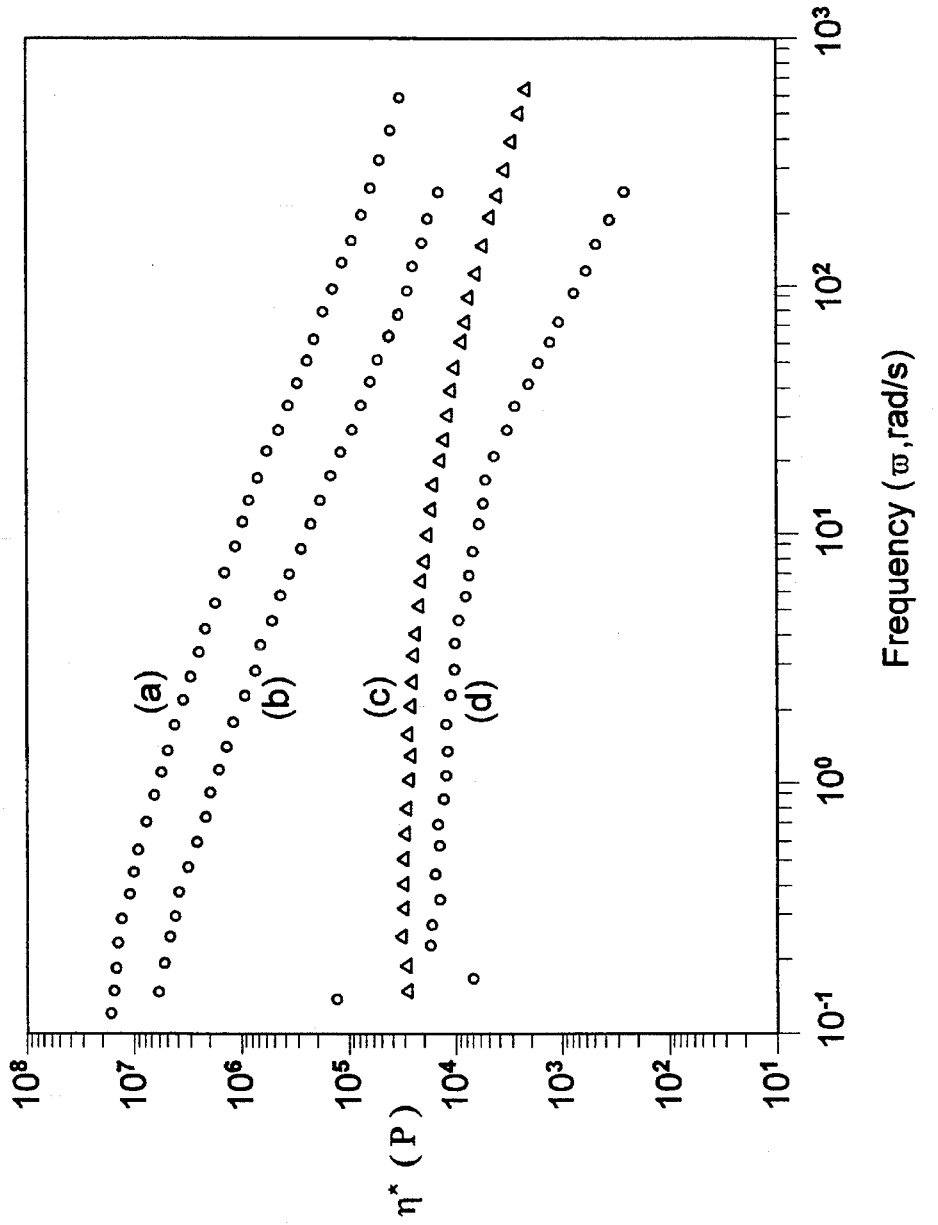
FIG. 3 shows complex viscosity versus frequency for polyamideimide resins at 330° C.

As seen from Table 2 and FIG. 3, the modified PAI resins, wherein isophorone diamine was introduced according to the present invention, have a melt viscosity (measured at 330° C. under 10$^{-1}$ rad/sec) of 2.6×10$^3$ to 2.0×10$^6$ poise which is much lower than that of Torlon, 1.8×10$^7$ poise measured under the same conditions. In addition, in order to observe the change of melt viscosity according to the temperature increase, the melt viscosity was measured at a temperature range of 300° C. to 370° C. using the same sample as mentioned above. As seen from FIG. 4, PAI resins according to the present invention have a melt viscosity which is much lower than that of Torlon-4000 under the same conditions, and thus show preferable processability.

Therefore, according to the present invention, by introducing isophorone diamine as a portion of the monomers into conventional PAI resins, it is possible to synthesize new PAI resins which have excellent heat resistance, solubility, improved processability owing to low melt viscosity and thus can be used as a major heat-resistant structural material in technically advanced industries including the auto, electrical and electronic industries.

What is claimed is:

1. A polyamideimide resin represented by the formula (I) having isophorone diamine

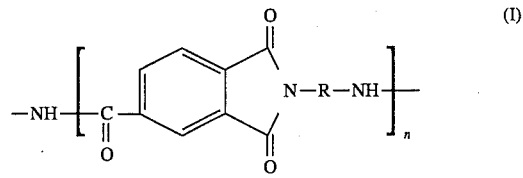

in which repeating units are bound in a head to tail or head to head manner,

R is at least two divalent groups selected from the group consisting of

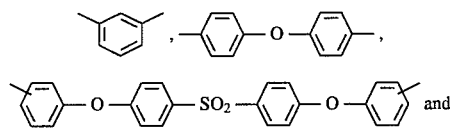

-continued

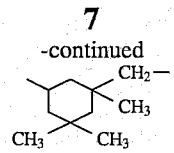

with one

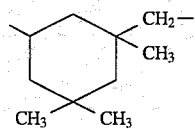

group in a PAI molecule.

2. A polyamideimide resin according to claim 1 having an inherent viscosity of 0.2 to 0.8 dL/g.

3. A polyamideimide resin according to claim 1 having a glass transition temperature of 220° C. to 300° C.

4. A polyamideimide resin according to claim 1 having a melt viscosity of $10^3$ to $10^6$ poise which is measured at a temperature of 330° C. and frequency of $10^{-1}$ rad/sec.

5. A process for preparing PAI resins represented by formula (I)

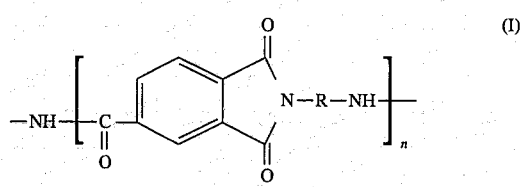

(I)

in which repeating units are bound in a head to tail or head to head manner,

R is at least two divalent groups selected from the group consisting of

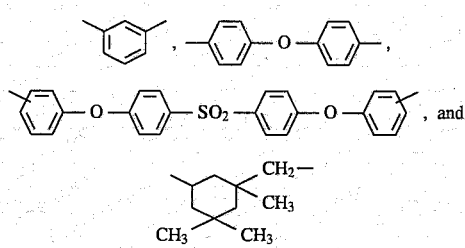

(cis-, trans- conformational mixture) with one of said groups being a

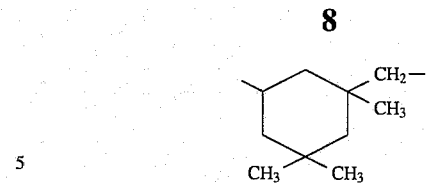

(cis-, trans-conformational mixture) group in the PAI molecule, which comprises carrying out solution polycondensation of meta-phenylene diamine, diminodiphenylether, meta-bisaminophenoxy diphenylsulfone or para-bisaminophenoxy diphenylsulfone represented by formulae (III), (IV), (V) and (VI)

   (III)

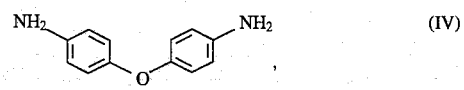   (IV)

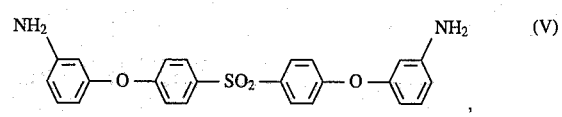   (V)

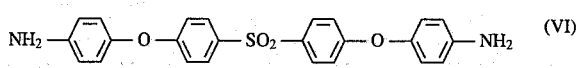   (VI)

as an aromatic diamine component and isophorone diamine represented by formula (II)

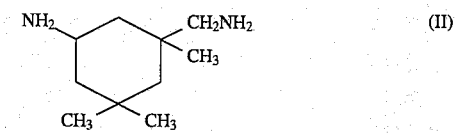   (II)

(cis-, trans-conformational mixture) as an aliphatic diamine component with anhydrous trimellitic acid or a derivative thereof.

6. A process according to claim 5, wherein the molar ratio of the isophorone diamine to the other diamine of Formula III, IV, V or VI is about 30/70.

7. A polyamideimide resin according to claim 1, wherein the molar ratio of linkages where R is

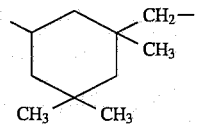

to the other divalent groups as defined by R is about 30/70.

* * * * *